United States Patent [19]

Meyer et al.

[11] 4,171,577
[45] Oct. 23, 1979

[54] GAP WIDTH MEASUREMENT FOR ROLLING MILLS

[75] Inventors: Ulrich Meyer, Lilienthal; Friedrich-Wilhelm Meyer, Stuhr-Moordeich; Gunter Dohrmann, Syke-Ristedt; Karl-Heinz Andresen, Stuhr; Siegmar Pfisterer, Bremen, all of Fed. Rep. of Germany

[73] Assignee: Vereinigte Flugtechnische Werke-Fokker GmbH, Bremen, Fed. Rep. of Germany

[21] Appl. No.: 898,944

[22] Filed: Apr. 21, 1978

Related U.S. Application Data

[63] Continuation of Ser. No. 701,993, Jul. 1, 1976, abandoned.

[30] Foreign Application Priority Data

Jul. 9, 1975 [DE] Fed. Rep. of Germany ....... 2530593

[51] Int. Cl.² .............................................. G01B 3/48
[52] U.S. Cl. .................................... 33/182; 33/148 H
[58] Field of Search ................... 33/182, 149 J, 143 L, 33/148 H, 199 R

[56] References Cited

U.S. PATENT DOCUMENTS

| 3,872,602 | 3/1975 | Kennedy et al. | 33/199 R |
| 4,044,580 | 8/1977 | Worden et al. | 33/182 |

FOREIGN PATENT DOCUMENTS

1102947 10/1965 France ...................................... 33/182

*Primary Examiner*—Willis Little
*Attorney, Agent, or Firm*—Smyth, Pavitt, Siegemund, Jones & Martella

[57] ABSTRACT

Two bearing sections pertaining to feelers on arms are maintained in engagement with journal axles of two rolls and a pair of transducer elements on the arms monitors therein distance from each other in representation of the roll gap. The arms can be pivoted out of the way in that the bearing sections are removed from between the axles.

6 Claims, 7 Drawing Figures

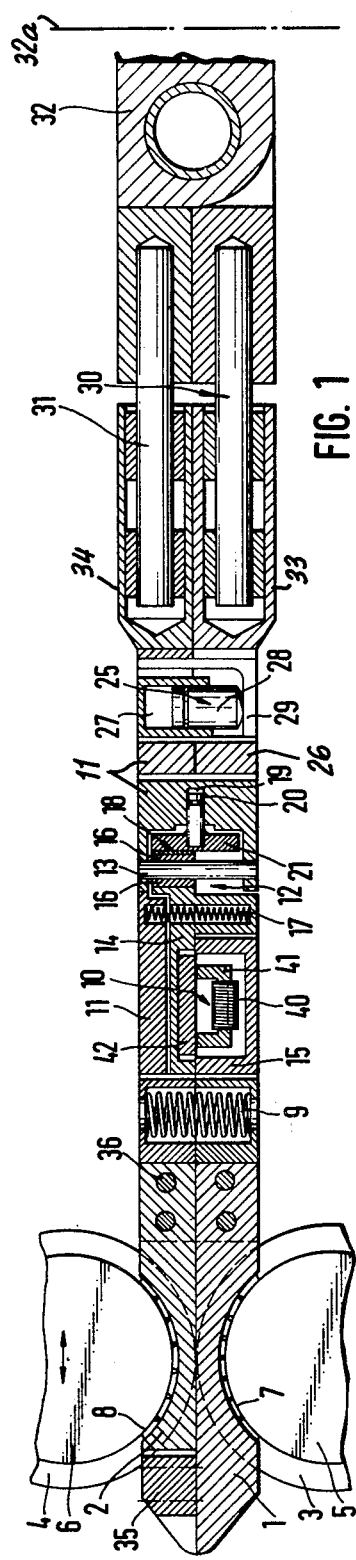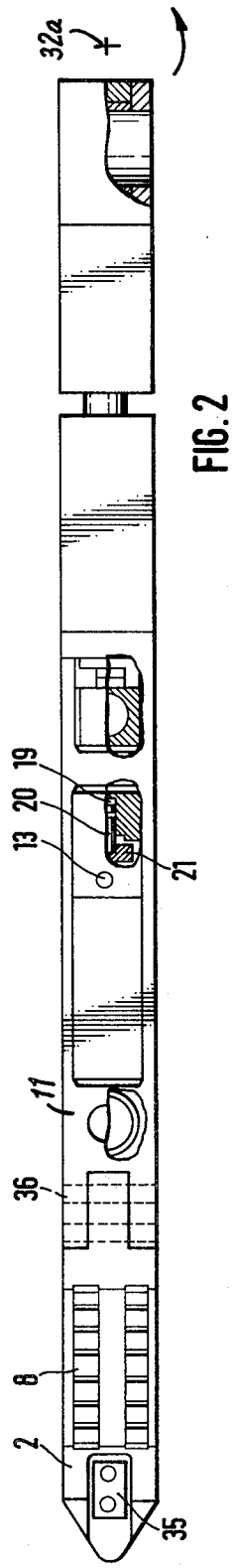

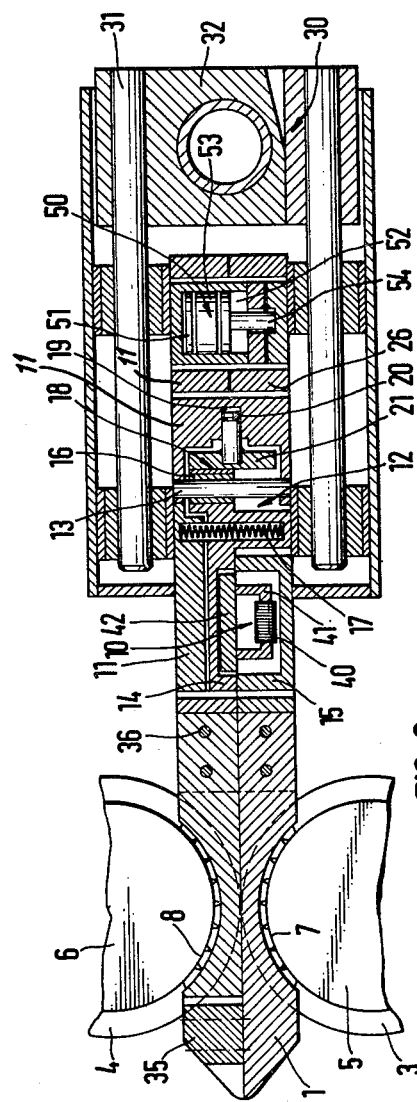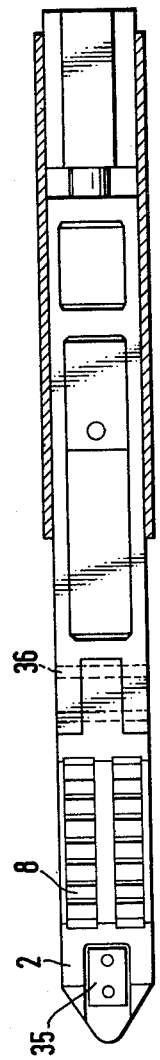

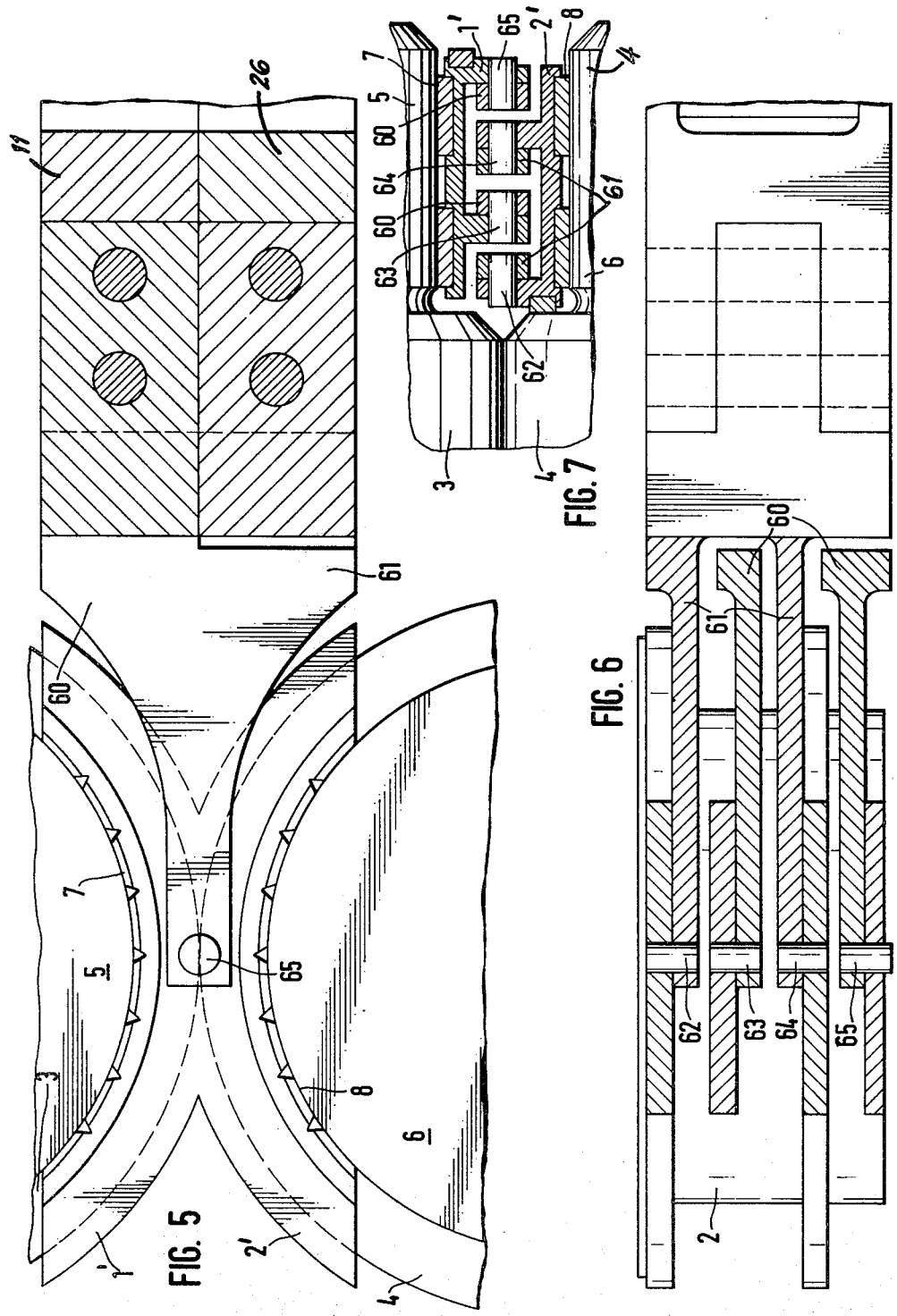

GAP WIDTH MEASUREMENT FOR ROLLING MILLS

This is a continuation of application Ser. No. 701,993, filed July 1, 1976 now abandoned.

BACKGROUND OF THE INVENTION

The present invention relates to noncontact measurement of the width of the gap between a pair of rolls in a rolling mill.

Rolling mills usually require control of the gap for purposes of controlling the thickness of the stock. The width of the rolling gap is, for example, detected by electromechanical transducer means having two elements whose distance varies with the gap width and is ascertained by operation of the transducer. The dynamics of such a control poses a formidable problem, as it is, of course, desirable to adjust the roll gap as fast as possible. Thus, the gap width should be measured without any delay. Transducers for contactless measuring the gap width are comprised, for example, of inductive, capacitive or other systems. However, the inductive systems are apparently more widely used and are preferred over the others. U.S. Pat. No. 3,662,576 discloses, for example, such a system for measuring the absolute value of the gap. The U.S. Pat. No. 3,817,008 discloses equipment for a relative measurement of gap width.

Both of these known systems have been practiced with advantage particularly because they operate with little sensitivity against temperature variations. It was found, however, that the employment of rings as part of the sensing equipment is not always possible. For example, they were not found practical for fast mills, and their life in a hot rolling mill was somewhat limited.

DESCRIPTION OF THE INVENTION

It is an object of the present invention to provide a new and improved apparatus for detecting and measuring the width of the gap between a pair of rolls in a rolling mill.

In accordance with the preferred embodiment of the present invention, it is suggested to provide a pair of displaceable arms (e.g. they may be hinged to each other with one end each) and feelers are mounted on one free end each, or the free ends of the arms; the feelers include bearing section elements being in rolling engagement with axles or journals of two rolls; the transducer has two elements which are respectively mounted on the arms to measure arm displacement while the bearing sections are maintained in engagement with the axles. The transducer elements are preferably mounted so that their particular position to each other is independently adjustable for purposes of calibration. The feelers with bearing sections may disengage from the axles either by a spring or hydraulically, and engagement is maintained preferably hydraulically. The entire arm arrangement is mounted for pivoting on a vertical axis so that the feelers can be removed from between the axles. It can, thus, be seen that no part of the transducer portions is actually mounted on any of the rolls whose gap is to be detected and measured.

DESCRIPTION OF THE DRAWINGS

While the specification concludes with claims particularly point out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a longitudinal section in a vertical plane of a measuring device in accordance with one example of the preferred embodiment;

FIG. 2 is a top view of the device of FIG. 1;

FIG. 3 is a view similar to FIG. 1 of a second example;

FIG. 4 is a top view of the device of FIG. 3;

FIG. 5 is a side view, partially in section of a modification of either of the devices of FIGS. 1 or 3;

FIG. 6 is a section view of the device of FIG. 5; and

FIG. 7 is a front section view of the devices of FIGS. 5 and 6.

Proceeding now to the detailed description of the drawings, FIGS. 1 and 2 show two sensors or feelers, 1 and 2, being disposed between the journal axles 5 and 6 of two rolls 3 and 4, respectively. The sensors 1 and 2, respectively, have bearing sections 7 and 8 which slidingly or rollingly engage the axles 5 wnd 6, to monitor the actual position of the rolls and to thereby obtain a physical displacement representation of distance or gap width between rolls 3 and 4. FIG. 1 shows the assembly for zero gap width for purposes of calibration. The rolls 3 and 4 have been polished for minimum diameters.

As soon as the roll holders in the mill stand (not shown) are adjusted for separating the rolls 3 and 4 by a particular gap, the sensors 1 and 2 will be separated by means of a compression spring 9 so that each of the sensors has its respective bearing section 7, 8, in engagement with the axles 5, 6. The feelers 1 and 2 are respectively bolted to an upper arm 11 and a lower arm 26. Arm 11 continues a sleeve or socket 34, and arm 26 continues a sleeve or socket 33. Bolts 36 permit removal and exchange of feelers 1 and 2, for example, for selection of different diameters for the bearing sections 7 and 8. Reference numeral 35 refers to a guide structure for positioning the feelers 1 and 2 relative to each other.

The gap detection proper is comprised of an electromagnetic transducer 10 having two portions 14 and 15, respectively, associated with and connected to the arms 11 and 26, while a device 12 provides for adjustable coupling between the transducer parts. Particularly, coupling arrangement 12 permits calibration of the transducer.

The transducer element or portion 15 is secured to lower arm 26. The situation is, however, different in regard to upper transducer element 14. This element has a sleeve 16 which rides on a pin 13 and the pin, in turn, is secured to upper arm 11. A spring 17 is interposed between arm 11 and element 14, urging the latter in down direction.

When the feelers 1 and 2 have zero-gap width position, the spring 17 urges element 14 against and onto transducer element 15 to thereby establish zero measuring and transducing conditions. In order to maintain the element 14 in that calibration position on arm 11, a clamping device 18 fixes the position of the transducer parts relative to each other, following calibration.

The clamping device 18 includes an hydraulic or pneumatic cylinder drive 19, having a piston 20 provided with a clamping bracket 21. Upon pressurizing cylinder 19, bracket 21 adjusts the position of sleeve 16 on pin 13 to thereby determine the calibration-zero position of the upper part 14 relative to the lower part 15 of transducer 10.

Reference numeral 25 refers to another hydraulic or pneumatic drive arranged behind device 18 and being provided for moving the feelers 1 and 2 towards each other. This drive 25 includes a cylinder 27 on arm 26 of lower feeler 1. A piston 28 cooperates hydraulically with cylinder 27 and acts on a follower 29 which is secured to arm 11 for upper feeler 2. As soon as cylinder 27 is pressurized, piston 28 moves follower 29 for shifting feelers 1 and 2 towards each other, against the force of spring 9. This then is the position of calibration. Upon relieving the hydraulics 27, 28, from the pressure, spring 9 takes over, and spreads arms 26-1 and 11-2 apart so that bearing sections 7 and 8 engage the journal axles 5 and 6 for monitoring the gap width.

These elements as described thus far are mounted to a pair of sleeves 33, 34, one sleeve per feeler, transducer part and arm, and these sleeves respectively receive pins 30 and 31, and in suitable bearings of the sleeves or sockets. The bearings permit the sleeves 33, 34 to ride on the pins 30, 31, so that axial length compensation is provided as feelers 1 and 2 are pivoted away from each other.

The pins 30, 31, in turn, extend from two arms which are hinged together for pivot motion by a hinge or pivot head 32. The latter, in turn, is mounted on bearings or the like pertaining to the mill stand which is not shown. Reference numeral 32a denotes a vertical hinge axis which permits the entire assembly of FIG. 1 for being pivoted out of the plane of the drawing.

It may also be presumed that this mount for hinge head 32 is hydraulically adjustable and can be swung out as stated, so that the feelers 1 and 2 are moved transversely to the plane of the drawings for removal from engagement with the roll axles!

The transducer 10 is constructed as follows. Part or element 15 receives a coil 40 on a core 41 having its two legs extending towards part or element 14. The leg ends are coplanar and define actually one reference or measuring plane. Transducer element 14 includes an armature 42 whose ends face the legs of core 41. The face of that armature 42 as facing the core 41 defines the complementary measuring or reference plane of transduction. The distance between these two planes represents the gap width to be measured. Please note that due to hinge 32 the distance of these two planes is not identical with the rolling gap because the latter as sensed by feelers 1 and 2 has a larger distance from the (horizontal) hinge axis of 32 than the distance of the transducer from that axis. This, of course, can be taken care of by calibration.

The device of FIGS. 3 and 4 is similarly constructed to the device of FIGS. and 1 and 2 as far as the feelers 1, 2, the transducer 10, and the coupling structure 12 are concerned. The length compensation mechanism, however, is not effective in axially flush arrangement as shown in FIGS. 1 and 2, but the respective parts are arranged to the side of hinge 32. The pins 30, 31, extend from the side alongside the parts 11 and 26 and the bearings for the pins are adjacent to these parts.

Another modification is the omission of the spring 9 and replacement of actuation 25 by a double action hydraulic device 50. The upper cylinder chamber 51, when charged with hydraulic fluid, spreads arms 11 and 26 with feelers 1 and 2 to obtain engagement of the latter with the roll axles. Upon charging cylinder chamber 52 (and venting 51) piston 53 retracts and piston rod 54 being secured to part 26 moves feelers 1 and 2 towards each other and into position shown in the Figures, e.g. for purposes of calibration.

Operationally, the two examples are not different, but one will chose one or the other depending upon the available mounting space. The device as per FIGS. 1 and 2 is slim but long, the other device is short but somewhat wider. Both examples for the preferred embodiment can be used for large and for small rolls and the rolling speed was found to be of negligible influence on accuracy and wear.

FIGS. 5 through 7 show a measuring device in which the feelers 1' and 2' are constituted directly by bearing elements 7 and 8. These elements are mounted respectively between the tips of two forks 60 and 61. This construction is particularly suitable for easy and frequent exchange. The two forks 60, 61, are interdigitized and their free ends have bores. Bolts 62 and 64 connect fork 61 with part 1 and bolts 63 and 65 connect fork 60 with part 2. These bolts are positioned and oriented so that their axes are aligned for a gap width of zero. This is particularly shown in FIG. 7.

Thus, in this particular example one has swivel mounts for the feeler-bearing segments and, unlike FIGS. 1 to 4, the zero gap width condition is not necessarily established by direct abutment of the feeler parts. Rather, zero gap width is established by aligning the swivel axes (pins 62 to 65) with each other.

It can thus be seen that during operation when the individual rolls may undergo up or down displacements of their axes, bearings 7 and 8 will turn on the axles so that they remain in engagement therewith.

As far as the remainder of the construction is concerned, arms 11 and 26, the transducers, calibrating means, actuation, etc., either of the construction of FIGS. 1 to 4 can be used.

The invention is not limited to the embodiments described above but all changes and modifications thereof not constituting departures from the spirit and scope of the invention are intended to be included.

We claim:

1. Apparatus for measuring the width of the gap between a pair of rolls of a stand in a rolling mill, comprising:

a head mounted to the stand for movement about a first axis the head remaining fixed during measuring;

a pair of arms mounted on the head for pivotal displacement relatively to each other on a second axis through the head, pivotal movement of the head about the first axis places the arms near or away from the rolls, the arm being provided for individual longitudinal displacement of their respective free ends to obtain length compensation;

a pair of bearing sections;

means including interdigitized forks for individually swivel mounting, the bearing sections respectively on free ends of the arms of the pair of amrs, the swivel mounts being coaxial for the two feelers in a zero position, said bearing sections as swivel mounted being provided for engagement with axles of the rolls, when the arms pivot relative to each other on the second axis;

means for causing the bearing elements to remain in said engagement; and a pair of transducer elements disposed for mutual cooperation to detect directly a distance from each other, the elements of the pair being respectively mounted on the portion of said arms, being subject to the length compensation.

2. Apparatus as in claim 1, wherein the means for causing includes resilient means and hydraulic means for acting against the resilient means.

3. Apparatus as in claim 1, wherein the means for causing is a hydraulic drive, being constructed for causing also disengagement of the bearing elements.

4. Apparatus as in claim 1 and including means for adjusting the position of the transducer elements relative to each other, independently from said displacement.

5. Apparatus as in claim 1, said feelers being exchangeably mounted on said arms.

6. Apparatus as in claim 1, said elements respectively including a coil with a core and an armature and defining at least one air gap between the core and the armature, the width of the air gap serving as representation of said gap between the rolls.

* * * * *